T. BUDZINSKY.
COMBINATION FAUCET.
APPLICATION FILED MAR. 15, 1920.
1,375,205.
Patented Apr. 19, 1921.
2 SHEETS—SHEET 2.
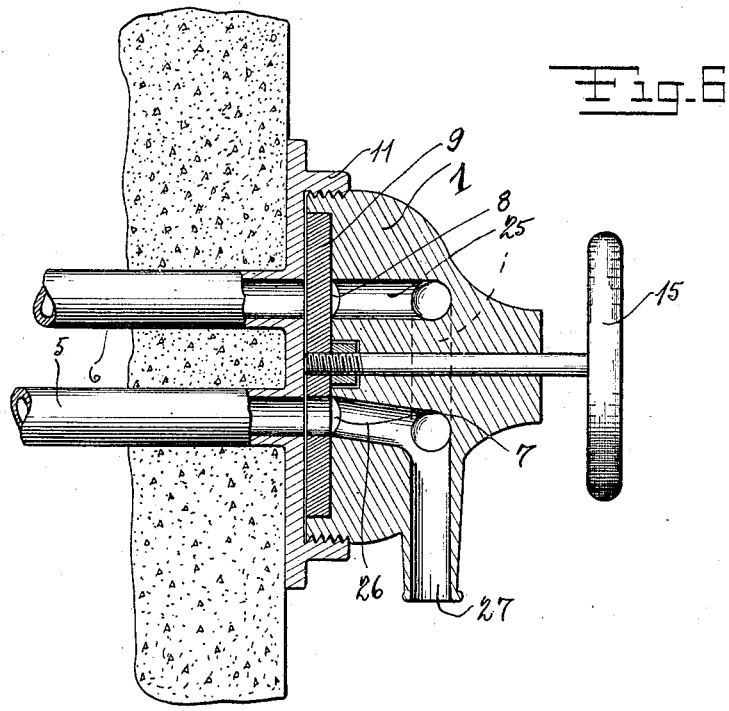
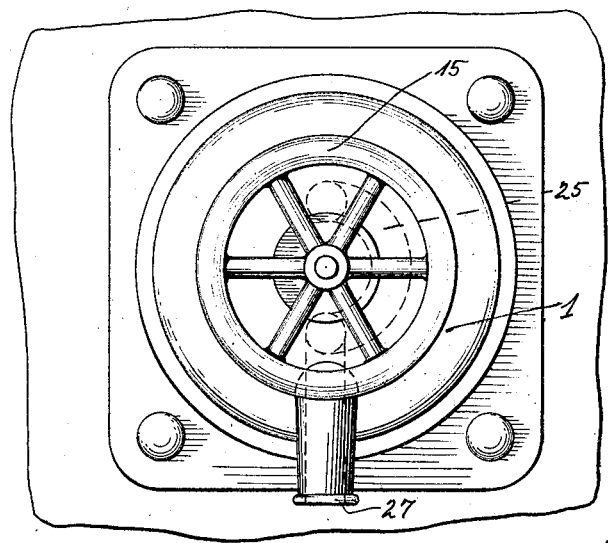

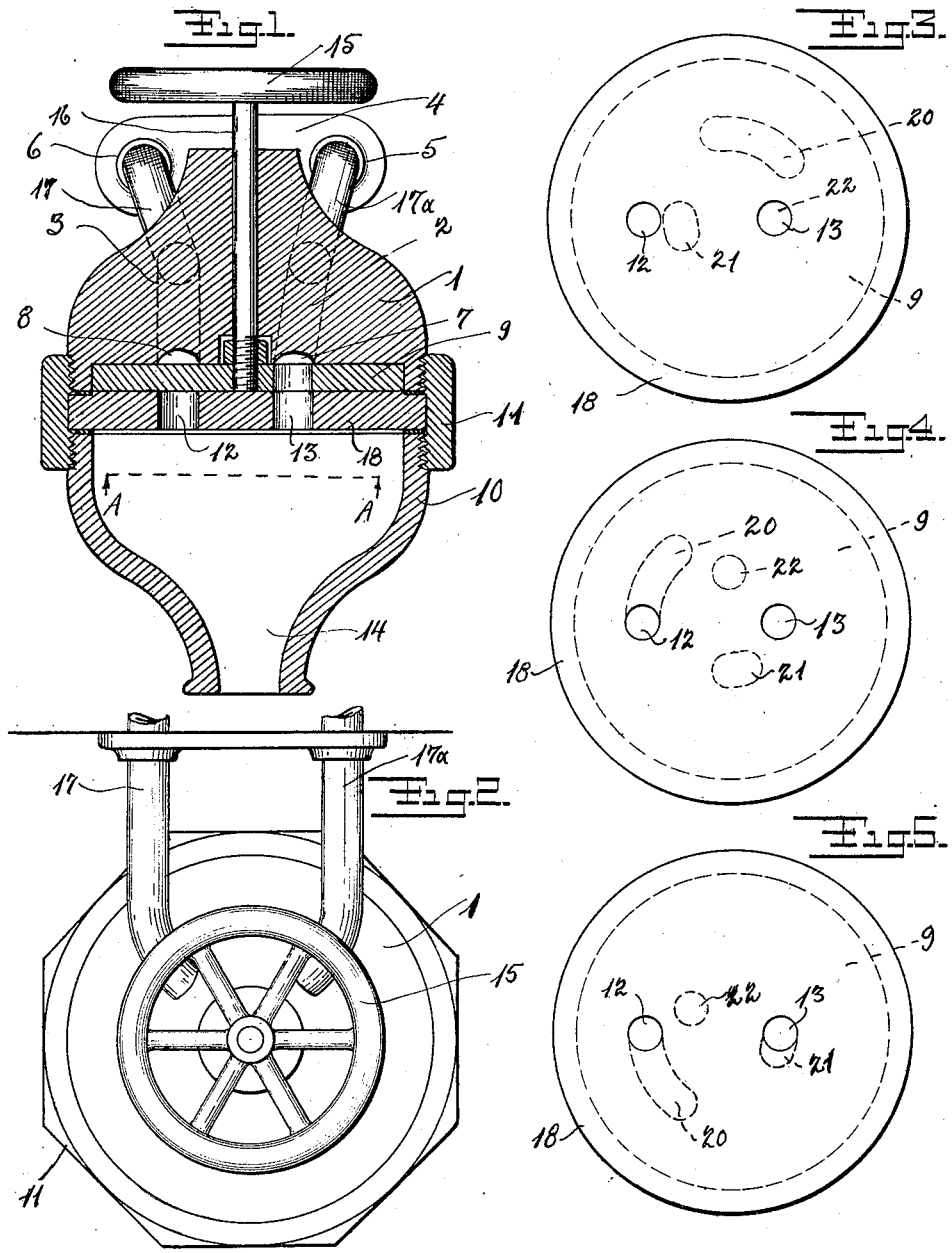

UNITED STATES PATENT OFFICE.

TANAS BUDZINSKY, OF NEW YORK, N. Y.

COMBINATION-FAUCET.

1,375,205.  Specification of Letters Patent.  Patented Apr. 19, 1921.

Application filed March 15, 1920. Serial No. 365,715.

*To all whom it may concern:*

Be it known that I, TANAS BUDZINSKY, citizen of Russia, and resident of New York, in the county of New York and State of New York, have invented certain new and useful Improvements in Combination-Faucets, of which the following is a specification.

This invention relates to combination faucets, and has for its main object the provision of such a device as will allow, by regulation of a single handle, the flow of either hot or cold water, or of a mixture of hot and cold to any desired degree within the range of the supply temperatures. The device is thereby very useful in the bath or on wash stands.

The above and other objects will become apparent in the description below, in which like characters of reference refer to like-named parts in the drawings.

Referring briefly to the drawings, Figure 1 is a central longitudinal cross-sectional elevation of my device.

Fig. 2 is a plan view of the same.

Fig. 3 is a view looking in the direction of the line A—A of Fig. 1, showing the relative position of parts to permit the flow of cold water alone.

Fig. 4 is a similar view showing the relative position of parts to permit the flow of hot water alone.

Fig. 5 is a similar view showing the relative position of parts to permit the flow of a mixture of hot and cold water.

Fig. 6 is a cross-sectional view of a modification of the above device.

Fig. 7 is a front view of the same.

Referring now in detail to the drawings, the numeral 1 represents the upper frame or casing of the device, and 2 and 3 represent respectively the cold and hot water inlet channels. These channels communicate through pipes 17ª and 17 respectively with respective inlets 5 and 6 in the wall 4. On the under side of the frame 1 the channels 2 and 3 are cupped as at 7 and 8, and a rotary plate or disk 9 is mounted thereunder. A second disk 18 which is, however, stationary, is mounted below the disk 9, and both disks are supported by a collar 11 and the outlet frame 10, as shown. The disk 18 has two circular holes 12 and 13 therein, the former being directly below the channel end 8, and the latter directly below the channel end 7.

The rotary disk 9 is provided with one circular hole 22 of the same diameter as the holes 12 and 13; a short substantially elliptical hole 21; a relatively longer substantially elliptical hole 20. The longer sides of the latter two holes are arcuate, and the distances between said sides is equal to the diameter of holes 12 and 13. The latter holes are not equally distant from the center of the disk 18, but are relatively placed as shown in Fig. 1. In the rotary disk 9, the hole 20 is at a distance from the center which is equal to the distance of the hole 12 from the center of the disk 18; and the holes 21 and 22 are at a distance from the center of the disk 9 which is equal to the distance of the hole 13 from the center of the disk 18.

A central vertical rod 16 is attached to the center of the disk 18, and the upper end of said rod is provided with a handle 15 for turning the same. The outlet casing 10 incloses a mixing chamber 14 through which the water issues into a tub or other device in which it is used.

Now, in operation, let it be assumed that cold water alone is desired; then the handle 15 is turned counter-clockwise until the disk 9 takes the position shown in Fig. 3. Then the hole 22 is coincident with the hole 13, thus allowing a free passage of the water from the channel 2 through the holes 22 and 13, into the chamber 14. If, now, only hot water is desired, the handle is turned farther in the same direction, through which the hole 22 leaves the hole 13, and the hole 20 approaches the hole 12. Because of the greater length of the former, hot water alone will flow through the device for a time as the handle is further turned in said direction. The handle is left in the position shown in Fig. 4 if hot water alone is desired. If, now, a mixture is desired, the handle 15 is turned farther in the same direction, whence the hole 21 begins to register with the hole 13, while the hole 20 is still in registration with the hole 12. Fig. 5 indicates these parts when both hot and cold water are flowing in full measure. If any degree of mixture is desired, it is apparent, the handle need only be left stationary in a position in either side of that shown in the latter figure.

From the above it is evident that, by a simple turning of the handle continuously in the same direction, either hot or cold water or any desired mixture of both, may be obtained. On continued rotation in the same direction, after Fig. 5, the disk 9 returns to the position shown in Fig. 1.

In the modified form of my device shown in Figs. 6 and 7, the device lies in a position at right angles to that disclosed in the other figures. The member 11 is attached to the wall through which the inlet, pipes 6 and 5 pass and the member 18 is rigidly made a part of said member 11. The channel mouths 7 and 8 lead into channels 25 and 26, respectively, in the body 1, and both of said channels lead into a common outlet 27. Thus the device is manipulated by the handle 15 in the same manner as that described previously.

I claim:

1. A combination faucet comprising an upper casing having inlet channels therein, a disk rotatably mounted on the under side of said casing, the mouths of said channels lying above said disk and at unequal distances from the center thereof, means for rotating said disk, a stationary disk mounted underneath said rotatable disk and having holes therein directly under the said mouths of said channels, and a plurality of spaced apart holes in said rotatable disk.

2. A combination faucet comprising an upper casing having inlet channels therein, a disk rotatably mounted on the under side of said casing, the mouths of said channels lying above said disk and at unequal distances from the center thereof, means for rotating said disk, a stationary disk mounted underneath said rotary disk and having holes therein directly under the said mouths of said channels, and a plurality of spaced apart holes in said movable disk including a hole adapted to register with one of said holes in said stationary disk and additional holes adapted to register with the other of said holes in said stationary disk.

3. A combination faucet comprising an upper casing having inlet channels therein, a disk rotatably mounted on the under side of said casing, the mouths of said channels lying above said disk and at unequal distances from the center thereof, means for rotating said disk, a stationary disk mounted underneath said rotatable disk and having holes therein directly under said mouths of said channels, and a plurality of spaced apart holes in said movable disk including a substantially circular hole and a substantially elliptical hole adapted to register with one of said holes in said stationary disk, and a second substantially elliptical hole adapted to register with the other of said holes in said stationary disk.

4. A combination faucet comprising a casing having channels therein, a disk rotatably mounted adjacent said casing, the mouths of said channels lying adjacent said disk and at unequal distances from the center thereof, means for rotating said disk, a stationary disk mounted adjacent said rotatable disk and having holes therein directly adjacent the said mouths of the said channels, and a plurality of spaced apart holes in said rotatable disk.

Signed at New York in the county of New York and State of New York this day of A. D. 1920.

TANAS BUDZINSKY.